United States Patent [19]
Ritchie

[11] Patent Number: 5,069,885
[45] Date of Patent: Dec. 3, 1991

[54] PHOTOCATALYTIC FLUID PURIFICATION APPARATUS HAVING HELICAL NONTRANSPARENT SUBSTRATE

[76] Inventor: David G. Ritchie, 41 Blue Ridge Crescent, London, Ontario, Canada, N6K 2W9

[21] Appl. No.: 512,311

[22] Filed: Apr. 23, 1990

[51] Int. Cl.[5] .............................................. B01J 19/08
[52] U.S. Cl. .............................. 422/186; 422/186.06; 422/186.3; 210/748; 210/763
[58] Field of Search ....................... 210/762, 763, 748; 422/186, 186.06, 186.05, 186.3, 24

[56] References Cited

U.S. PATENT DOCUMENTS

| | | | |
|---|---|---|---|
| 4,788,038 | 11/1988 | Matsunaga | 210/748 |
| 4,798,702 | 1/1989 | Tucker | 210/748 |
| 4,863,608 | 9/1989 | Kawai et al. | 210/748 |
| 4,892,712 | 1/1990 | Robertson et al. | 422/186 |
| 4,966,759 | 10/1990 | Robertson et al. | 422/186 |

FOREIGN PATENT DOCUMENTS

| | | | |
|---|---|---|---|
| PH7074 | 7/1987 | Australia | 210/763 |

OTHER PUBLICATIONS

"Solar Electric Water Purification Using Photocatalyic Oxidation with $TiO_2$ as a Stationary Phase", by Ralph W. Matthews, *Solar Energy,* 33, 405–413, 1987.

*Primary Examiner*—Stanley S. Silverman
*Assistant Examiner*—Cynthia L. Nessler
*Attorney, Agent, or Firm*—Carson, Armstrong

[57] ABSTRACT

Apparatus for the purification of a fluid, such as water, which in the presence of light of an activating wavelength brings the fluid into contact with surfaces with fixed photoreactive coatings of anatase ($TiO_2$) or other photoreactive semiconductors, thereby detoxifying, reducing or removing organic pollutants therefrom. The apparatus includes a nontransparent substrate coiled longitudinally and helically around a transparent sleeve. The nontransparent substrate has photoreactive semiconductor material bonded thereto. The nontransparent substrate defines a helical path through an annular cylindrical housing.

12 Claims, 5 Drawing Sheets

PHOTOCATALYTIC FLUID PURIFICATION APPARATUS HAVING HELICAL NONTRANSPARENT SUBSTRATE

BACKGROUND OF THE INVENTION

1. Field of the Invention

This invention relates to the detoxification, reduction or removal of organic pollutants from fluids such as water or air. Such pollutants include trihalomethanes, polychlorinated biphenyls (PCBs), pesticides, benzene derivatives and others.

2. Description of the Prior Art

For some time it has been known that, in the presence of certain wavelengths of light, titanium dioxide and certain other semiconductors can achieve photodechlorination of PCBs. U.S. Pat. No. 4,892,712 (Robertson et al) summarizes the prior art, referring to publications by Carey et al, Chen-Yung Hsiao et al, Matthews, and Serpone et al.

The Matthews apparatus contained a coil around a lamp, where transparent glass tubing was used to form a single, continuous, self-contained fluid channel. In this configuration, the tubing must be transparent in order for the photoactive coating inside the tube to receive the light. Also, more than 50% of the light generated by the lamp is lost between the spaces of each revolution of the coils and the walls of the tubing. This type of assembly would not be practical in a commercial application.

The invention in the Robertson et al patent attempts to "adapt [the] previously observed laboratory reaction to a practical fluid purification system . . . ". Robertson et al recognized that in order for the process to be practical, the $TiO_2$ must be immobilized to some substrate. They accordingly immobilized a $TiO_2$ coating on a porous, filamentous, fibrous or stranded, transparent matrix such as a fiberglass mesh, through which the fluid can flow in intimate contact with the photoreactive material. The matrix, e.g. fiberglass mesh, is wrapped in several layers around a fluorescent lamp. The matrix must be sufficiently transparent for light to penetrate to the outer layers of the mesh. Accordingly, either a transparent base material such as glass must be used or a matrix with a sufficiently open structural form, such as a screen, must be used, so that light can penetrate to the outer layers.

The use of concentric layers of transparent substrates, treated with the photoactive materials, is limited by the ability of the light to penetrate successive layers. The requirement that the substrate material be substantially transparent and inert to the reactants further limits the choice of substrates.

In all of the prior art, either the $TiO_2$ (or other semiconductor) must be in suspension in the fluid in transparent tubing, or the substrates to which the semiconductor is bound must be transparent to light, in order for the photoactive materials to be exposed.

SUMMARY OF THE INVENTION

It is an object of the invention to provide apparatus which avoid the above mentioned drawbacks of the prior art. More specifically, it is an object to provide apparatus which achieves the desired results with the $TiO_2$ being immobilized on a substrate, but without requiring that the substrate be transparent.

When exposed to ultraviolet light, titanium dioxide (particularly anatase) as well as certain other semiconductors, eject electrons from their lattices, creating positive holes (H+). The emitted electrons and holes created in the $TiO_2$ lattice can either react with the organic pollutants in solution or they can recombine. In order to minimize the recombination and maximize the reaction it is necessary to ensure rapid mixing of the fluid to keep the surface coating of anatase supplied with fresh reactants. The supporting substrate must therefore be in a form suitable to create the necessary turbulent mixing as the fluid passes in order to break the boundary layer typically associated with a fluid passing over a surface, and to provide the reaction sites with fresh reactants.

In a process requiring the photoactivation of a material, illumination of the photoreactive material with sufficient light of the appropriate wavelength is of critical importance. It is also important to provide a large surface area coated with the photoreactive material, so that there will be numerous reaction sites available to the reactants—in this application, the pollutants to be removed.

In the present invention, the substrate need not be transparent in material or structure, because the placement of the substrate enables light to penetrate to the outer layers. The substrate of the invention is a strip or strips shaped, e.g. by crimping, into the form of a helix which is placed around the lamp with the edges of the material used for the substrate adjacent the lamp and the broad surfaces of the substrate projecting radially outwardly from the surface of the lamp, at an angle to form a helix. With this structure, light radiating outwardly in all directions from the lamp wall strikes both flat surfaces of the "blades" of the substrate simultaneously. The helical configuration of the present invention does not in itself form a self-contained, fluid carrying channel. Only by enclosing the helix within a cylindrical jacket of an internal diameter similar to the outside diameter of the helix, will a channel be formed.

A thin layer of $TiO_2$ or other suitable material is firmly bonded to the substrate material. A fluorescent type lamp, capable of generating light at a wavelength suitable to activate the photoreactive coating, is then inserted into the center of the helical coil such that light irradiating outwardly from the lamp will strike both upper and lower surfaces of the crimped section of the helical coil, as well as the uncrimped surface of the coil which will be facing the lamp. The lamp and the helical coil are then inserted into a sleeve such that the inside diameter of the sleeve is only very marginally larger than the outside diameter of the helix. With the lamp positioned at the center of the helical coil and the sleeve wall to the outside of the helical coil, a single continuous channel is formed. The sleeve is closed at each end with caps that provide a means for allowing the lamps to extend through the caps using sealing O-rings to provide a fluid tight seal between the wall of the lamp and the cap. In order to permit the fluid to be treated, inlet and outlet ports are installed on the sleeve. Fluid introduced at one end of the sleeve will spiral around the lamp with great turbulence as it passes over the convoluted crimped sections of the channel while travelling to the opposite end. In this manner, the present invention exposes the fluid to a long, turbulent path of reaction sites to maximize the reaction rates.

The preferred form of the present invention obviates the need for the substrate to be transparent by novel positioning of the substrate with relation to the light source. In the preferred embodiment, the broad surfaces of the substrate which are coated with the photoreactive materials are positioned in radial orientation to the light source, enabling the light radiating from the central lamp to strike the photoreactive coating on both upper and lower surfaces simultaneously. Thus, with the helical configuration of the substrate in the preferred embodiment, light radiating from the central lamp strikes the photoreactive coating on the surfaces of the substrate without first having to penetrate through the substrate underlying the photoreactive coating. Hence, there is no longer any necessity for the substrate to be transparent in order to permit transmission of light through it.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
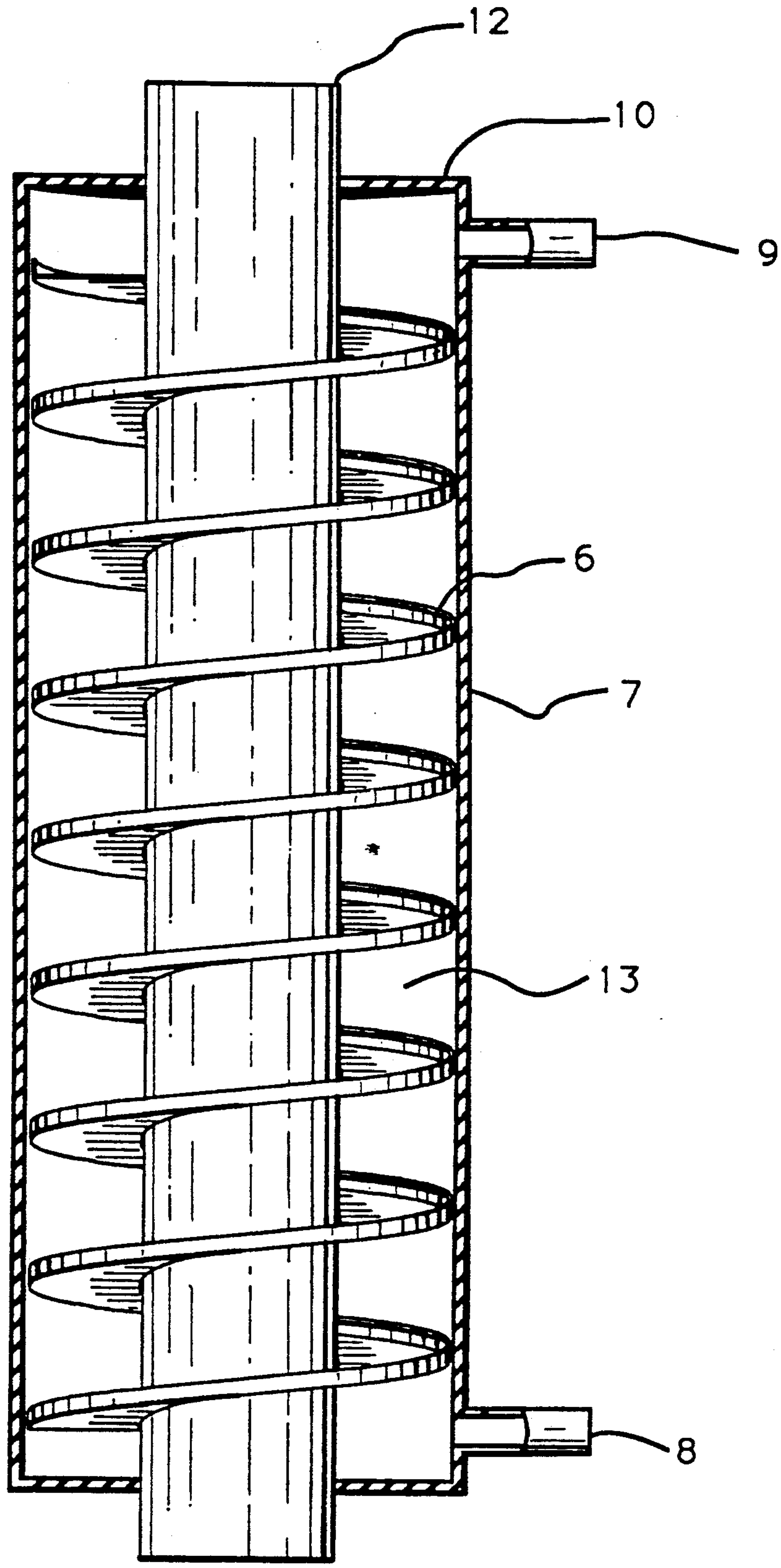
FIG. 1 is an illustration of how such a helix can be used in practice.

FIG. 1 illustrates the presently preferred embodiment of the invention. A helix 6 coated with $TiO_2$ or other suitable photoreactive material (not shown), is enclosed in a jacket 7 provided with inlet port 8 and outlet port 9 and end caps 10 and 11, which allow the ends of a transparent sleeve 12 to extend therethrough. The helix is preferably L-shaped in cross-section, to provide some structural rigidity. Conventional sealing O-rings provide a fluid tight seal between the sleeve wall and the end caps, but are not shown. This assembly creates a fluid channel 13 which will cause the fluid to pass spirally around the tube lamp (not shown), which is positioned in the transparent sleeve. The fluid is forced through the apparatus at a flow rate sufficient to create great turbulence, the turbulence being assisted as well by the crimping of the substrate necessary to form the strip into a helical shape.

Figure 2:
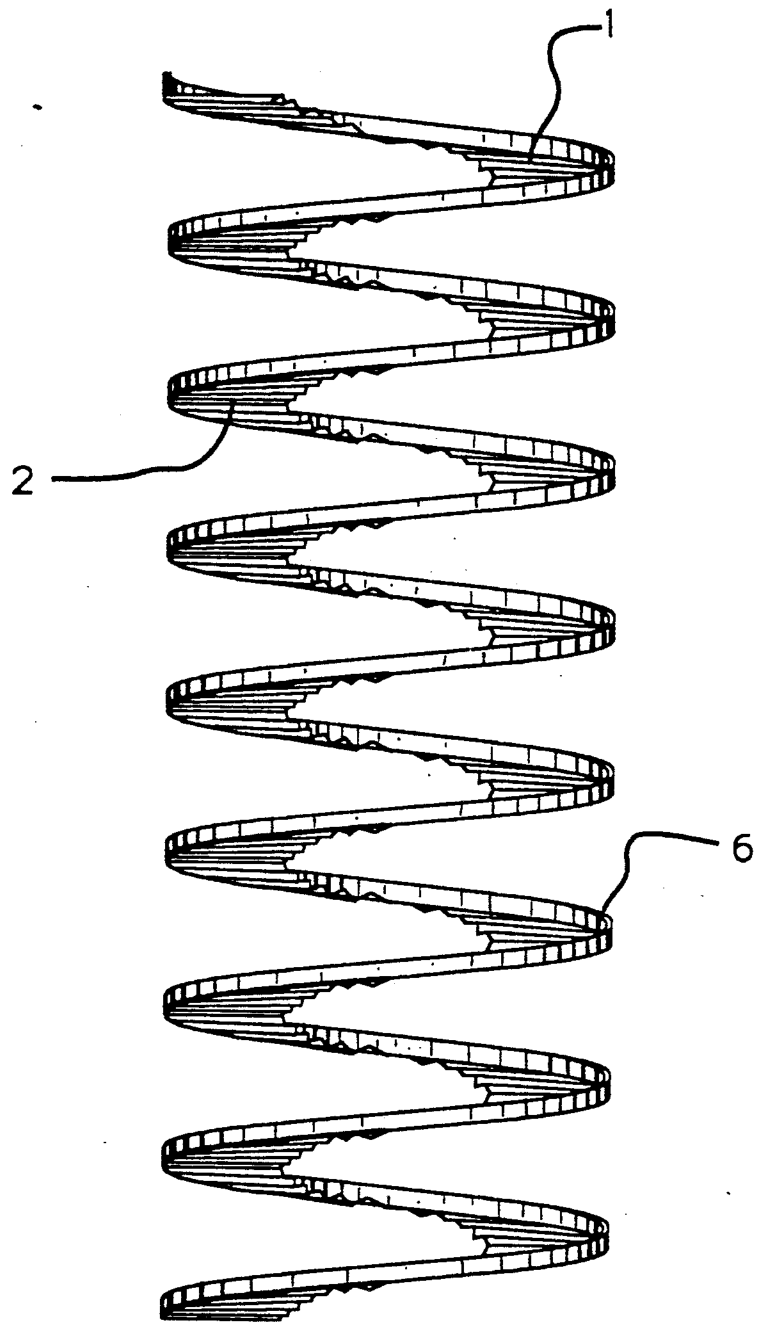
FIG. 2 is a perspective view of the helix.
Figure 3A:
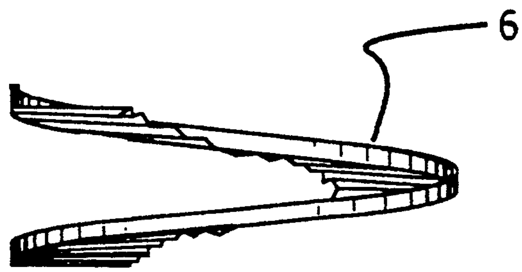
FIG. 3 is a perspective view of a single and a double revolution helix.
Figure 3B:
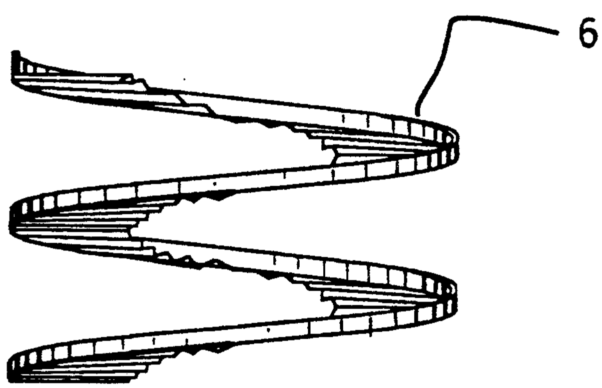
Figure 4:
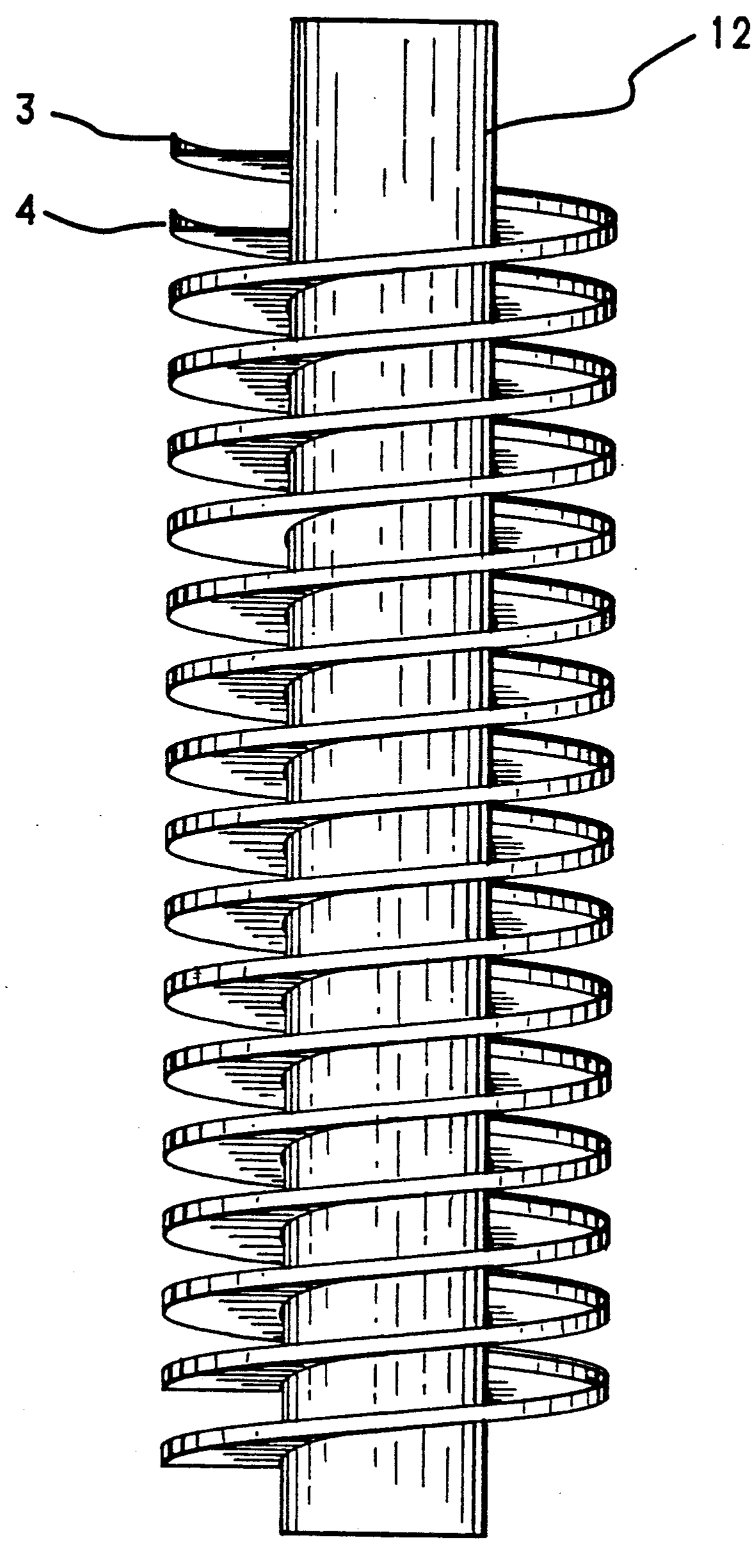
FIG. 4 shows two helices intertwined and placed around a lamp or transparent sleeve.

FIG. 2 illustrates a helix with the large surfaces placed radially to the longitudinal axis of the helix. FIG. 3 illustrates a single revolution helix, which by alignment and stacking of numerous such helices, can form a continuous helix. FIG. 4 illustrates how more than one helix 3 and 4 can be intertwined together to increase the available surface area for photoexposure.

Either a lamp, or a transparent sleeve 12 with a lamp inside the sleeve, is placed in the center of the helix or helices, to illuminate the coated surfaces of the helical substrate.

Figure 5:
FIG. 5 is an illustration of a multi helix formed from 8 strips with a high aspect ratio per revolution.

FIG. 5 illustrates a series of eight helixes, positioned around a transparent sleeve. FIG. 5 shows that the surfaces of the individual helixes are still positioned radial to the central axis, even as the ratio of longitudinal travel to rotation of the helix increases.

In instances where the fluid must be purified in a single pass, it may be necessary to provide a long helix, transparent sleeve and jacket, i.e. in the form of a pipe line, with numerous photoactivating lamps installed end to end to provide illumination of the entire helix or helices. Where abundant solar energy is available, the helix may be installed in a transparent jacket, to permit the use of solar radiation to activate the photoreactive material. If it is necessary for the purification process to operate on a continuous basis, a transparent sleeve may be installed in the center of the helix, with lamps which may be used during overcast periods and at night, and switched off to conserve power and extend the lamp life, when solar radiation is available.

In an alternate form of the present invention, the helix may be formed by stacking numerous single or multi-revolution helixes, around the lamp. With this method, the helices can be formed through stamping or molding processes, thereby broadening the possible choices of substrate materials.

In the preferred form of the present invention, a substrate such as, but not limited to, a thin walled metallic strip, is first roll-formed to provide an essentially continuous L channel, i.e. one which is L-shaped in cross-section, with the leg of the L-shape being quite small, and intended primarily for structural strength. The L channel is then fed through a pair of canted meshing gears, such that one leg of the L channel is crimped into a series of sine-wave-like undulations. This crimping action causes the L channel to be bent into a continuous helical coil with the crimped section forming the inner radius of the coil.

The method of bonding the photoreactive material, e.g. anatase, to the substrate material varies with the substrate chosen, and is not part of the invention per se. Typically, use of the known sol-gel technique, will be effective. See for example, "Use of Sol-Gel Thin Films in Solar Energy Applications" by R. B. Pettit et al, Solar Energy Materials, Volume 14, pp. 269–287, 1986, Elsevier Science Publishers B.V.—North Holland Physics Publishing Division, Amsterdam.

Only metal oxides can be applied using the sol-gel technique. Alternate methods must be used to apply the non-oxide semiconductors, such as vacuum or vapor deposition, or electroplating. In some cases, depending on the base material used, it may be preferable to first apply a coating of an intermediate bonding material to enhance adhesion to the substrate.

It should be clear that the invention is not limited to the use of $TiO_2$, but could be used with any other suitable semiconductor known at present or becoming known in the future.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. Apparatus for removing, reducing or detoxifying organic pollutants from a fluid, comprising:

(a) a fluid purification apparatus comprising a nontransparent substrate, having a photoreactive semiconductor material, bonded with or onto the surfaces of the nontransparent substrate, over which a fluid can flow in intimate contact with the photoreactive material in the presence of a photoactivating light, the nontransparent substrate forming a helix;

(b) a cylindrical lamp mounted at the center of the helix, capable of exposing said photoreactive material to light of a photoactivating wavelength;

(c) a jacket provided with inlet and outlet ports, enclosing the helix and the lamp, such that the inner wall of the jacket is in close proximity with the outer portion of the helix;

(d) end caps to the jacket provided with means to allow the ends of the lamp to extend therethrough in sealed fashion to maintain a fluid tight chamber within the boundaries of the jacket, the end caps, and the wall of the lamp.

2. Fluid purification apparatus comprising a nontransparent substrate coiled longitudinally and helically around a transparent sleeve, said nontransparent substrate further comprising a stationary photocatalyst, said photocatalyst comprising photoreactive semiconductor material secured to the external surfaces of said helical nontransparent substrate to form a photocatalytic helix, said fluid purification apparatus further comprising a jacket of internal diameter marginally greater than the external circumference of said photocatalytic helix, said jacket further comprising an inlet port, an outlet port, and an end cap at each end, said end caps allowing said transparent sleeve to extend therethrough in sealed fashion therewith.

3. Apparatus as recited in claim 2, wherein said jacket is transparent to light of a photoactivating wavelength, to allow said light to enter the jacket from the exterior thereof.

4. Apparatus as recited in claim 2, wherein the photoreactive materials is selected from the group consisting of $TiO_2$, CdS, CdSe, $ZnO_2$, $WO_3$ and $SnO_2$.

5. Apparatus as recited in claim 2, said nontransparent substrate further comprising an assembly of at least two single or multiple revolution helices, spaced apart and stacked around said transparent sleeve to form an essentially continuous helix.

6. Apparatus as recited in claim 5, wherein said jacket is transparent to light of a photoactivating wavelength, to allow said light to enter the jacket from the exterior thereof.

7. Apparatus for removing, reducing or detoxifying organic pollutants from a fluid, comprising:

a substantially transparent cylindrical tube, adapted to receive a generally cylindrical lamp;

a cylindrical housing around said tube, said housing having end caps at opposite ends thereof, said tube passing through said end caps in a fluid-impervious connection, the enclosed space between said end caps, housing and tube constituting a cylindrical annulus;

at least one radially oriented nontransparent substrate wound around said tube across substantially all of radius of said annulus so as to define at least one corresponding helical path from near one end of said annulus to near the other end of said annulus, said nontransparent substrate having photoreactive material bonded thereto;

a fluid inlet port near one end of said annulus and a fluid outlet port near the other end of said annulus.

8. Apparatus as recited in claim 7, in which said photoreactive material is selected from the group consisting of $TiO_2$, CdS, CdSe, $ZnO_2$, $WO_3$ and $SnO_2$.

9. Apparatus as recited in claim 7, in which each said nontransparent substrate is in the form of a generally L-shaped metallic strip.

10. In a fluid purification apparatus comprising means for removing, reducing, or detoxifying organic pollutants from a fluid, the improvement comprising a helix having at least one nontransparent substrate wound into a helical shape with each said nontransparent substrate oriented radially, the inner edge of each said nontransparent substrate being of a fixed radius so as to define a cylindrical opening along the center of said helix, said nontransparent substrate having photoreactive material bonded thereto.

11. A helix as recited in claim 10, in which said photoreactive material is selected from the group consisting of $TiO_2$, CdS, CdSe, $ZnO_2$, $WO_3$ and $SnO_2$.

12. Apparatus as recited in claim 10, in which each said nontransparent substrate is in the form of a generally L-shaped metallic strip.

* * * * *